Aug. 21, 1951     C. A. STOKES     2,564,736
PROCESS OF PRODUCING CARBON BLACK

Filed March 8, 1947     3 Sheets-Sheet 1

INVENTOR.
Charles A. Stokes.
BY
Kenway & Witter

Patented Aug. 21, 1951

2,564,736

UNITED STATES PATENT OFFICE 2,564,736

PROCESS OF PRODUCING CARBON BLACK

Charles A. Stokes, Wellesley Hills, Mass., assignor to Godfrey L. Cabot, Inc., Boston, Mass., a corporation of Massachusetts Application March 8, 1947, Serial No. 733,417

2 Claims. (Cl. 23—209.8)

This invention consists in a novel and unitary process of making carbon black and a synthesis gas. It is characterized by the step of burning streams of natural gas and oxygen, or a mixture of natural gas and oxygen, in the absence of air, in a confined and unobstructed combustion space. It has the advantage of increasing the yield of carbon black and of producing also a valuable gaseous product.

It has been the practice for some time to manufacture liquid fuels from natural gas using a synthesis gas made from natural gas and oxygen and consisting principally of CO and $H_2$. In that process, for example, dry natural gas may be burned under high pressure with oxygen to yield a synthesis gas having carbon monoxide and hydrogen as its principal constituents and a composition that may be controlled within narrow limits. The process may be carried to its conclusion on the Fischer-Tropsch synthesis principle whereby a gaseous mixture of carbon monoxide and hydrogen passed over a catalyst under suitable conditions of temperature and pressure is caused to yield hydrocarbons in the liquid fuel range. I have discovered that by supplying natural gas and oxygen in the proper proportions to the combustion space of a carbon black producing furnace, I can not only improve the yield and production rate of carbon, but produce a tail-gas which is of the composition desired for the Fischer-Tropsch synthesis. For each 15,000 cubic feet of this synthesis gas charged to the plant, one barrel of crude synthetic oil and substantial amounts of oxygenated compounds, including alcohols, ketones and aldehydes, are produced.

I have found that the use of pure oxygen with natural gas and without compensating procedure sometimes tends to such a high concentration of carbon black within the combustion chamber that a troublesome amount of carbon deposition occurs. There is, moreover, in some cases a deleterious effect on the quality of the carbon black due to the high concentration of the reacting hydrocarbon fuel, and a tendency to form carbon black of large particle size. Both of these difficulties I have been able to overcome without sacrificing the yield of high grade Fischer-Tropsch synthesis gas. As a further feature of my invention, therefore, I contemplate recirculating a substantial portion of the tail-gas, and mixing it with the oxygen to form a dilute oxygen mixture which may then be burned with the natural gas. The re-introduction of carbon monoxide and hydrogen with the oxygen delivered to the combustion space has a favorable effect in suppressing some of the carbon destroying reactions, as to a certain extent the oxygen burns the CO and $H_2$ first, thus tending to increase the net recovery of carbon from the natural gas consumed. The carbon destroying reactions suppressed or reduced in this manner are (1) the burning of methane (since carbon monoxide and hydrogen will burn more rapidly), and (2) a reduction in the water gas reaction

$$C + H_2O \rightleftharpoons CO + H_2$$

due to the already high partial pressure of carbon monoxide and hydrogen tending to prevent the reaction from taking place to the right.

By the process of my invention a stack or tail-gas is produced which contains large quantities of CO and $H_2$ contaminated only with relatively small amounts of $CO_2$, water vapor, and undecomposed methane, all of which can be removed from the CO and $H_2$ by convenient and inexpensive steps; for example, by scrubbing the tail-gas with an alkaline solution to remove carbon dioxide and any hydrogen sulfide and drying the gas by absorption, adsorption, or refrigeration. The small amount of methane left undecomposed does not ordinarily interfere with the Fischer-Tropsch synthesis but if desirable it may be scrubbed out with an oil.

It may be noted at this point in explanation of the advantages of the present invention that if air should be used with natural gas rather than oxygen, the tail-gases would be contaminated with nitrogen which cannot be removed except by a costly liquefaction process.

It is evident that in mixing pure oxygen with CO and $H_2$, an explosive mixture is likely to result. It is important, therefore, to carry out this step under certain safeguards, for example, it may be desirable to dilute the CO-$H_2$ recycle gas with extra quantities of $CO_2$ and water vapor to reduce the inflammability limits of the mixture. This is not objectionable because both $CO_2$ and water vapor tend to some extent to be converted to $H_2$ and CO under the reducing conditions within the combustion space.

Incidentally, some of the less desirable liquid hydrocarbon products of the Fischer-Tropsch synthesis may be used as fuel for the carbon black furnace, or the resulting oil may be catalytically cracked to produce additional gasolene and the recycle gas oil could be burned to make carbon and more synthesis gas. By proceeding in this manner we have a process which produces two marketable products, high-grade gasolene and high-grade carbon black, and no unused by-products.

By further modification the process of my invention could be carried out using an all liquid hydrocarbon feed; no natural gas being needed at all, for in that case the make material would be a gaseous medium carrying a liquid hydrocarbon. The methane and ethane produced in the Fischer-Tropsch synthesis would in this case be returned to the carbon black furnace, this being a most desirable use for such by-product gas. This modification is the subject-matter of my co-pending application Ser. No. 227,915 filed May 23, 1951.

The desired ratio of hydrogen to carbon monoxide for the Fischer-Tropsch synthesis is about two. This is obtained by the reaction $$CH_4 + \tfrac{1}{2}O_2 \rightarrow CO + 2H_2$$

When some of the carbon is removed in the form of carbon black this ratio is somewhat increased. Some of the hydrogen may be also removed in the form of water. Operating conditions may be adjusted to permit this result.

These and other features of my invention will be best understood and appreciated from the following description of a preferred manner of putting it into practice as suggested by the accompanying flow sheet and apparatus shown in the accompanying drawings in which.

Referring first to the flow sheet, it may be assumed that the carbon black furnace is of the type fully disclosed in United States Letters Patent No. 2,418,475 dated April 8, 1947, in that it thus provides a confined unobstructed combustion space of substantial size. To the burner of this furnace natural gas is supplied by the pipe line marked "Natural Gas," and oxygen is supplied by the pipe marked "Oxygen" from an oxygen separation unit of any convenient or commercial design. Oxygen is supplied in a ratio of about two volumes of natural gas to about one volume of oxygen. The oxygen-natural gas mixture is subjected to partial combustion within the furnace, the oxygen being completely consumed, and the products of combustion are led from the furnace to the carbon black collective system. This may include a Cottrell, Ultrasonic or bag filter mechanism, together with a water cooling element. From this station the carbon black may be drawn off through the duct marked "Carbon Black" in Fig. 3 and the tail-gases advanced to a carbon dioxide removal station. At this stage carbon dioxide may be removed by scrubbing the gas with an alkaline solution and discharged through the pipe marked "Carbon Dioxide."

The recycle gas may be led from the duct leaving the carbon black collection system and recycled through a dryer, marked "Dryer" in the flow sheet, to be mixed with the natural gas, or the oxygen supplied to the carbon black furnace, or to be delivered directly to the furnace simultaneously with them. The flow sheet indicates valved connections for any one of the desired dispositions of the recycle gas. In some cases it may be desirable to omit the step of drying the recycle gas, since, as already pointed out, in the combustion space the water vapor will break down into CO and $H_2$.

Upon leaving the carbon dioxide removal station the tail-gas is passed through a dryer, water is removed, and the dry gas produced is ready for Fischer-Tropsch synthesis.

In order to proceed under the same conditions that are now employed in making several grades of standard furnace carbon blacks, the amount of tail-gas recirculated is adjusted to about four volumes of the natural gas supplied to the system; that is to say, there is delivered to the combustion space one volume of natural gas, two volumes of oxygen, and four volumes of recycle gas. Since the recycle gas is substantially all combustible, this means about six parts of combustible gas to one part of oxygen. In using this ratio of gaseous ingredients, I have found it desirable to feed the gas which is to be cracked to carbon, i. e. the natural gas, to the furnace in small jets of uniform size, each jet producing the same type of carbon black. The desired results may be accomplished by modifying the conventional "Sterling" burner shown in the patent above identified to introduce three separate streams of gas into the combustion space.

Figure 2:
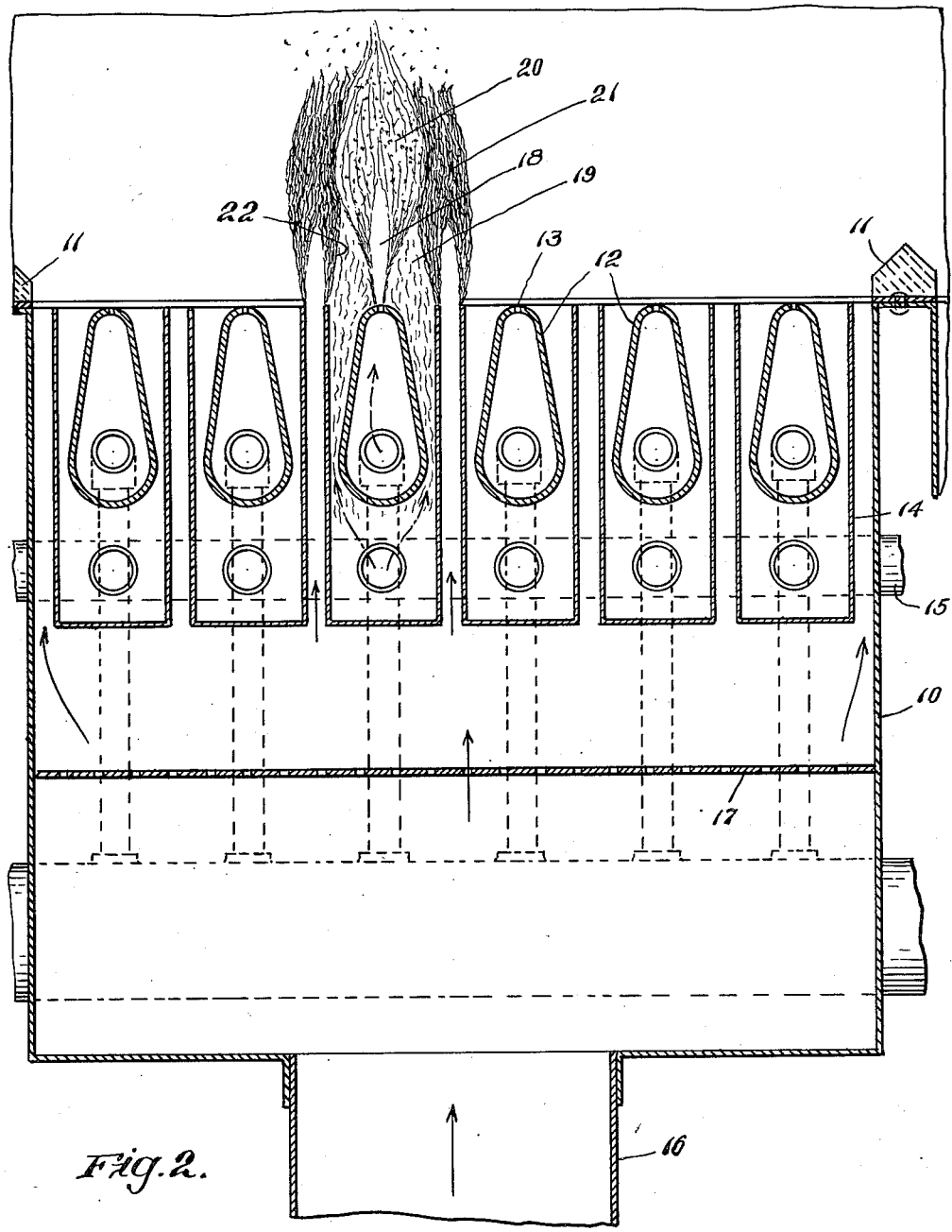
Fig. 2 is a fragmentary view showing diagrammatically one form of burner used in carrying out the combustion step of the process.

Referring to Fig. 2, a burner box 10 is shown as attached to a portion of the front wall 11 of the furnace, the wall being cut out to receive the burner box. Within the burner box is arranged a series of vertical burner pipes 12 spaced uniformly from each other and being pear-shaped in cross-section. They are disposed with their narrow walls directed forwardly into the opening in the furnace wall. Natural gas is supplied to these burner pipes by connections as indicated and delivered by them through a multiplicity of small orifices 13 in the narrow wall of each pipe in a series of small, well distributed jets.

Each burner pipe is surrounded by a channel-shaped shield 14 open at its forward end. Recycle gas is supplied to these shields from a transverse header 15 and delivered by them in streams which divide to pass about the burner pipes and envelopes each row of jets. Oxygen is supplied to the outer portion of the burner box through a pipe 16. It is distributed uniformly in passing through a perforated baffle 17 located transversely within the burner box, and then passes forwardly in the space between the shields to the combustion space thus enveloping or surrounding the stream of recycled gas.

The approximate distribution of the gaseous ingredients is shown at one side of Fig. 2. A jet of unburned, undiluted natural gas 18 issues directly from an orifice 13 of a burner pipe. This is surrounded on both sides by an area of unburned recycle gas 19. Directly opposite the burner pipe is a luminous zone 20 wherein the carbon black is formed. At each side of this zone and partly overlapping the adjacent zones is a zone 21 where the oxygen burns with the recycle gas and the natural gas. The recycle gas burns with the oxygen at the inter-face marked 22. Beyond these definite zones the oxygen has disappeared and carbon black is formed at high temperature from the products of combustion as they advance toward the outlet duct of the combustion space.

Figure 1:
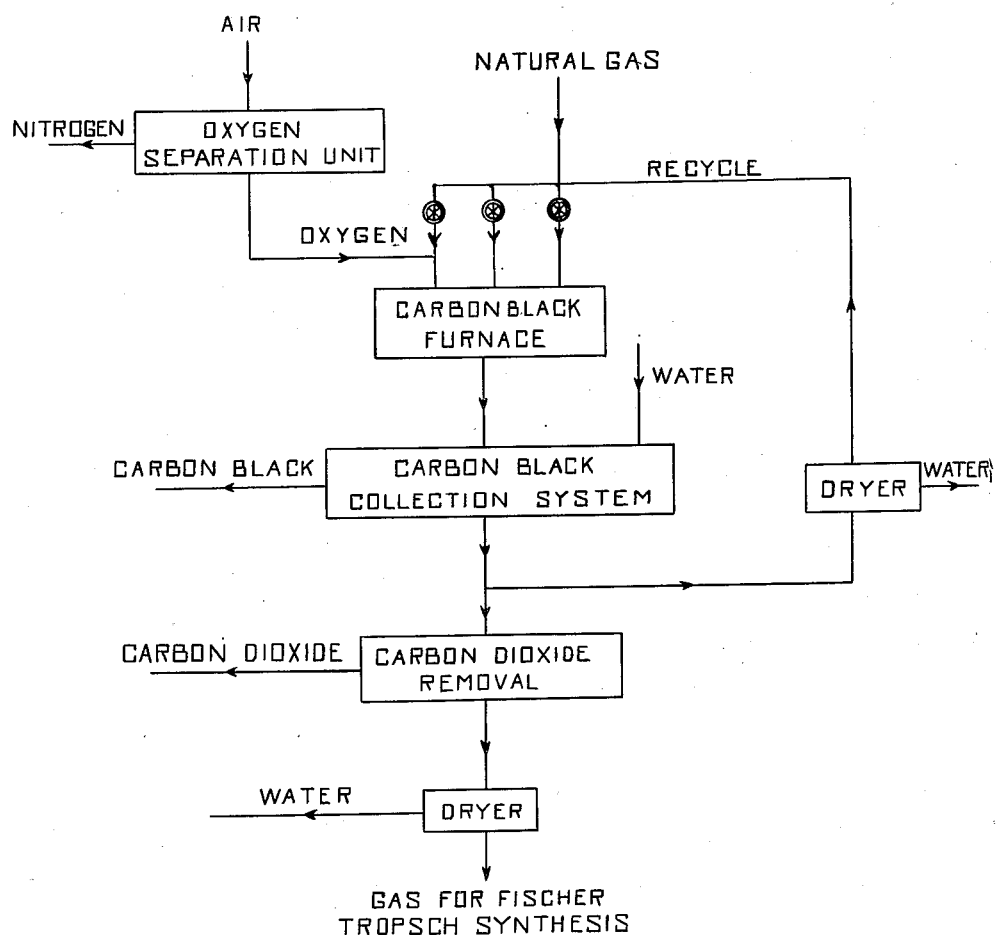
Fig. 1 is a diagrammatic flow sheet of the process.
Figure 3:
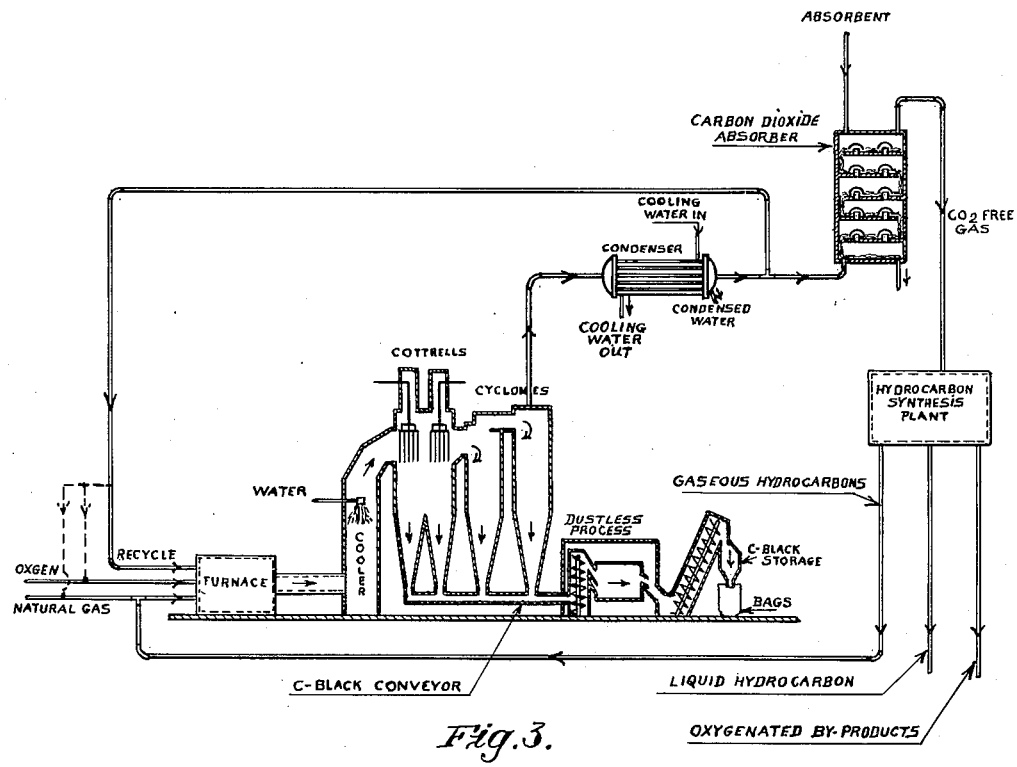
Fig. 3 is a diagrammatic view of a plant for carrying out the process.

In Fig. 3 is shown a plant operating in accordance with the flow sheet of Fig. 1. The various elements of the plant are clearly marked. The furnace may be of the type above identified. The products of combustion, including the particles of carbon black suspended therein, pass directly from the furnace to a vertical cooler wherein a spray head distributes cooling water to the rising gas borne column of carbon black particles. The partially cooled material is then passed through a pair of Cottrell separators and then to a pair of cyclone separators. The carbon black is precipitated and delivered by an underlying conveyor to apparatus marked "Dustless Process" wherein the flocculent carbon black is converted into dustless self-sustaining pellets. In this form it is conveyed by an inclined screw conveyor to a storage chamber from which it can be conveniently packed into bags.

Meanwhile the gaseous products of combustion are drawn from the top of the second cyclone separator in the series and conducted through a condenser where they are further cooled. Upon leaving the condenser the recycle gas may be at once brought back to the furnace or to the oxygen supply pipe or to the natural gas supply pipe. The remainder of the recycle gas is caused to flow upwardly through a carbon dioxide absorber, herein shown as consisting of a bubble cap tower. The gas, now freed from $CO_2$, is then conducted directly to a station for hydrocarbon synthesis marked "Hydrocarbon Synthesis Plant." From this may be drawn gaseous hydrocarbons to be returned to the furnace, liquid hydrocarbons, and oxygenated by-products.

Having thus disclosed the process of my invention and described in detail an illustrative example thereof, I claim as new and desire to secure by Letters Patent:

1. The continuous process of producing carbon black and synthesis gas for liquid fuel, which is characterized by the steps of continuously delivering to an unobstructed combustion space natural gas in rows of small jets, enveloping each row of jets in a stream of nitrogen-free recycled gas, enveloping each current of recycled gas in a stream of substantially pure oxygen, and maintaining reaction temperature by partial combustion of the oxygen with the recycled gas and the natural gas thereby producing carbon black and the recycle gas used in the process.

2. A continuous process of producing at the same time carbon black and synthesis gas for liquid fuel, which is characterized by the steps of continuously delivering to an enclosed furnace space hydrocarbon gas in parallel rows of small jets, delivering nitrogen-free recycled gas in streams on both sides of each row of the hydrocarbon gas jets, delivering substantially pure oxygen in streams on both sides of each of the recycled gas streams in a ratio of approximately one volume of oxygen to two volumes of hydrocarbon gas, and maintaining reaction temperature by partial combustion of the oxygen with the natural gas and the recycled gas, thereby dissociating carbon black from the hydrocarbon gas and at the same time producing the recycled gas used in the process.

CHARLES A. STOKES.

REFERENCES CITED

The following references are of record in the file of this patent:

UNITED STATES PATENTS

| Number | Name | Date |
|---|---|---|
| 1,402,957 | Poindexter | Jan. 10, 1922 |
| 1,711,036 | Beekley | Apr. 30, 1929 |
| 1,811,854 | Lewis | June 30, 1931 |
| 1,902,797 | Burke | Mar. 21, 1933 |
| 1,987,643 | Spear et al. | Jan. 15, 1935 |
| 2,106,137 | Reed | Jan. 18, 1938 |
| 2,144,971 | Heller et al. | Jan. 24, 1939 |
| 2,199,475 | Wilcox | May 7, 1940 |
| 2,322,989 | Wilcox | June 29, 1943 |

Certificate of Correction

Patent No. 2,564,736　　　　　　　　　　　　　　　　　　August 21, 1951

CHARLES A. STOKES

It is hereby certified that error appears in the printed specification of the above numbered patent requiring correction as follows:

Column 3, line 45, after "pipe" insert *line*; column 4, lines 11 and 12, for "space one volume of natural gas, two volumes" read *space two volumes of natural gas, one volume*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*